(12) United States Patent
Payne

(10) Patent No.: US 6,675,740 B1
(45) Date of Patent: Jan. 13, 2004

(54) ANIMAL SHELTER

(76) Inventor: Joe Payne, 2316 Oriole St., Ponca City, OK (US) 74601

( * ) Notice: Subject to any disclaimer, the term of this patent is extended or adjusted under 35 U.S.C. 154(b) by 0 days.

(21) Appl. No.: 10/228,532

(22) Filed: Aug. 26, 2002

(51) Int. Cl.[7] .............................. A01K 1/02; A01K 1/00
(52) U.S. Cl. ...................................... 119/486; 119/482
(58) Field of Search ............................ 119/482, 484, 119/485, 486

(56) References Cited

U.S. PATENT DOCUMENTS

| | | | |
|---|---|---|---|
| 1,549,229 A | | 8/1925 | Smithline |
| 1,851,188 A | | 3/1932 | Kibble |
| 2,034,156 A | * | 3/1936 | Snider .................. 119/486 |
| 2,324,339 A | | 7/1943 | Vanbussum |
| 2,358,588 A | | 9/1944 | Palmer |
| 2,795,208 A | * | 6/1957 | Rasmussen ........... 119/486 |
| 4,161,924 A | | 7/1979 | Welker |
| 4,827,872 A | | 5/1989 | Sommers |
| 4,962,729 A | * | 10/1990 | Barreto et al. ........ 119/482 |
| 5,448,965 A | * | 9/1995 | McClure ............... 119/482 |
| 5,615,640 A | | 4/1997 | Luiz |
| 5,746,271 A | | 5/1998 | DeCosta |
| 5,809,936 A | | 9/1998 | Wall |
| 6,318,294 B1 | * | 11/2001 | Richmond et al. ..... 119/482 |
| 6,427,630 B1 | * | 8/2002 | Oehler, Jr. ............. 119/486 |

* cited by examiner

Primary Examiner—Charles T. Jordan
Assistant Examiner—Elizabeth Shaw
(74) Attorney, Agent, or Firm—Dunlap Codding & Rogers

(57) ABSTRACT

An animal shelter having a housing, an enclosed hatchway, and a foyer. The housing defines a shelter cavity. The enclosed hatchway defines a travel path therethrough which is in open communication with the shelter cavity of the housing to permit ingress to and egress from the shelter cavity of the housing. The enclosed hatchway extends upwardly and outwardly from the housing a sufficient distance such that when the housing is disposed in the ground a depth sufficient to maintain the temperature within the housing substantially constant at all times. A distal end of the enclosed hatchway is disposed about the ground. The foyer extends from the distal end of the enclosed hatchway in open communication therewith.

32 Claims, 3 Drawing Sheets

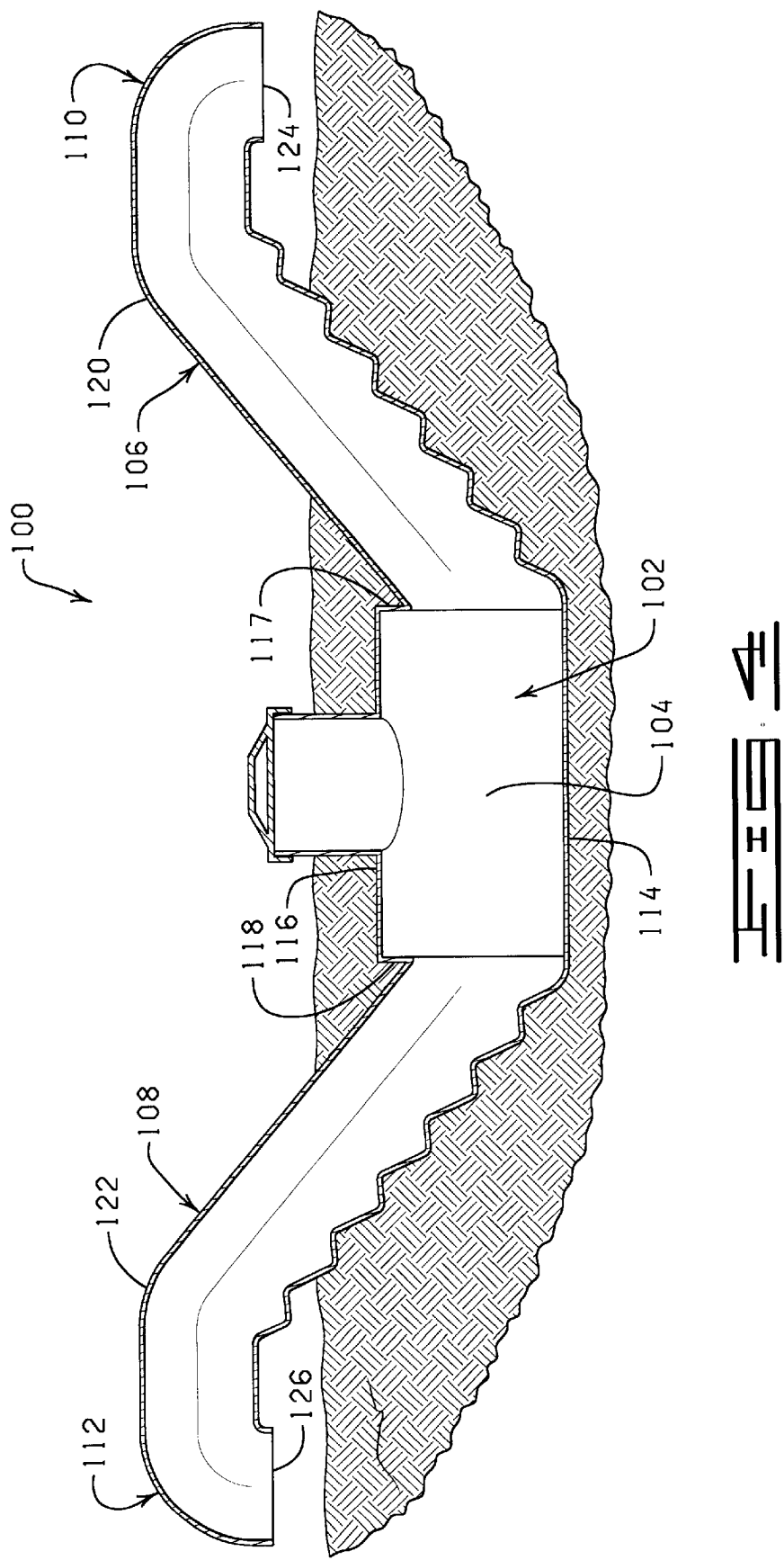

ANIMAL SHELTER

BACKGROUND OF THE INVENTION

1. Field of the Invention

The present invention relates to animal shelters and more particularly, but not by way of limitation, to an animal shelter disposed in the ground to maintain a substantially constant temperature within the shelter while preventing liquids from entering the shelter.

2. Discussion of Related Art

A variety of structures have been used to provide shelters for various domesticated animals, including dogs. These shelters protect animals from the wind and rain and some include external heating and or cooling systems for controlling the temperature within the shelter. However, the common shelter fails to provide environmental control within the shelter and those that provide environmental control of the interior, do so through the use of external heating or cooling systems requiring electricity or other sources of independent power. Such external heating or cooling systems require additional electrical costs, are complicated to install, and subject to high maintenance and repair costs.

To this end, a need exists for an animal shelter which is simple in construction, protects animals from the elements, and in which a substantially uniform temperature is maintained without requiring external heating or cooling systems. It is to such an animal shelter that the present invention is directed.

BRIEF DESCRIPTION OF THE DRAWINGS

FIG. 4 is a cross-sectional view of another embodiment of an animal shelter constructed in accordance with the present invention shown disposed in the ground.

DETAILED DESCRIPTION OF THE INVENTION

Figure 1:
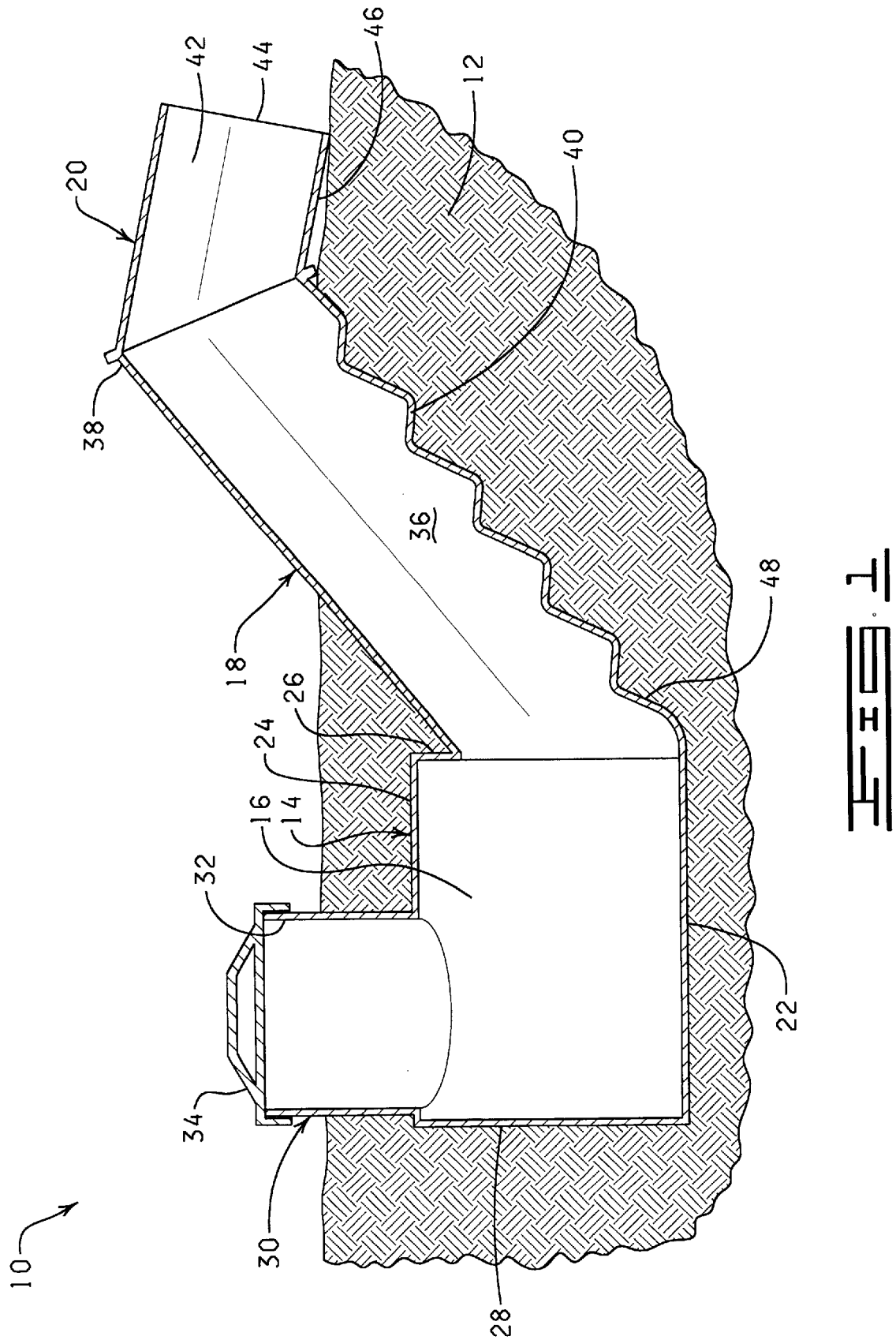
FIG. 1 is a cross-sectional view of an animal shelter constructed in accordance with the present invention shown disposed in the ground.

Referring now to the drawings, and more particularly to FIG. 1, an animal shelter 10 constructed in accordance with the present invention is shown disposed in the ground 12. The animal shelter 10 includes a housing 14 defining a shelter cavity 16 sized to accommodate one or more animals, a hatchway 18 in open communication with the shelter cavity 16 to permit ingress to and egress from the shelter cavity 16 of the housing 14, and a foyer 20 extending from the hatchway 18. The foyer 20 is constructed to prevent elements, such as rain and snow, from entering the hatchway 18 and passing down into the shelter cavity 16 of the housing 14. The animal shelter 10 is buried in the ground 12 a sufficient depth to utilize the insulating properties of the ground 12 to maintain a substantially constant temperature within the shelter cavity 16 of the housing 14.

Figure 2:
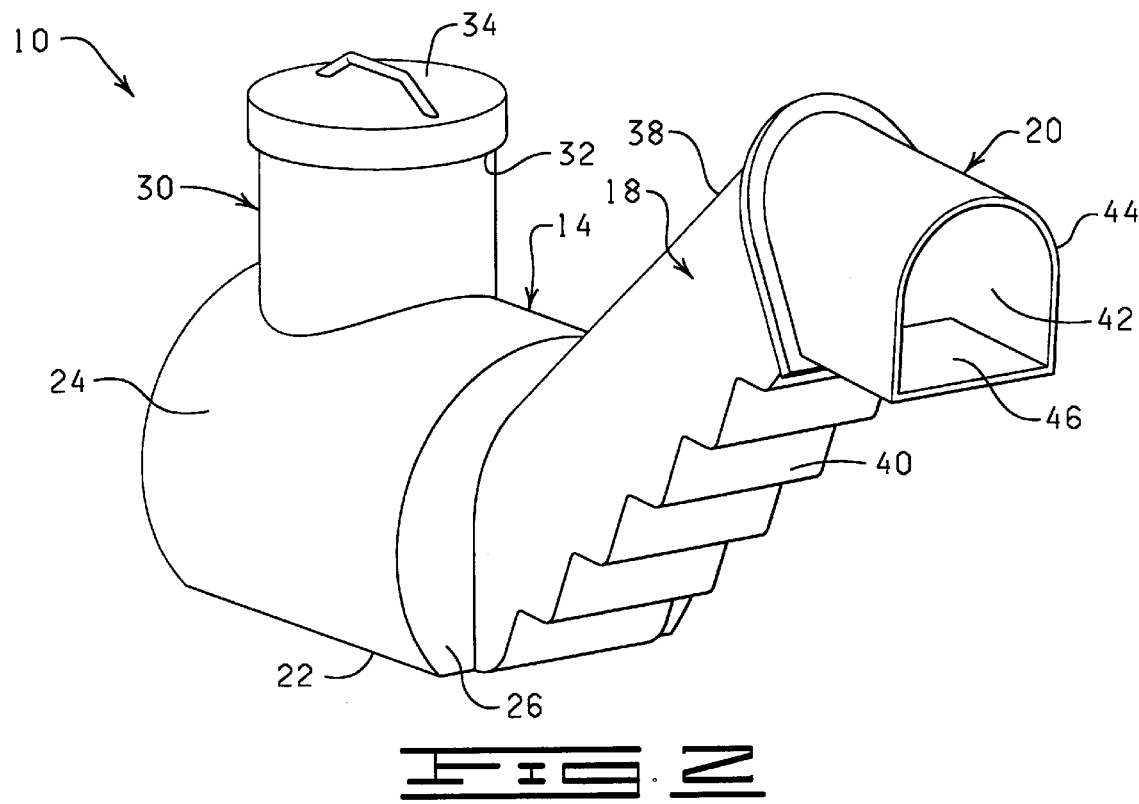
FIG. 2 is a perspective view of the animal shelter of FIG. 1.
Figure 3:
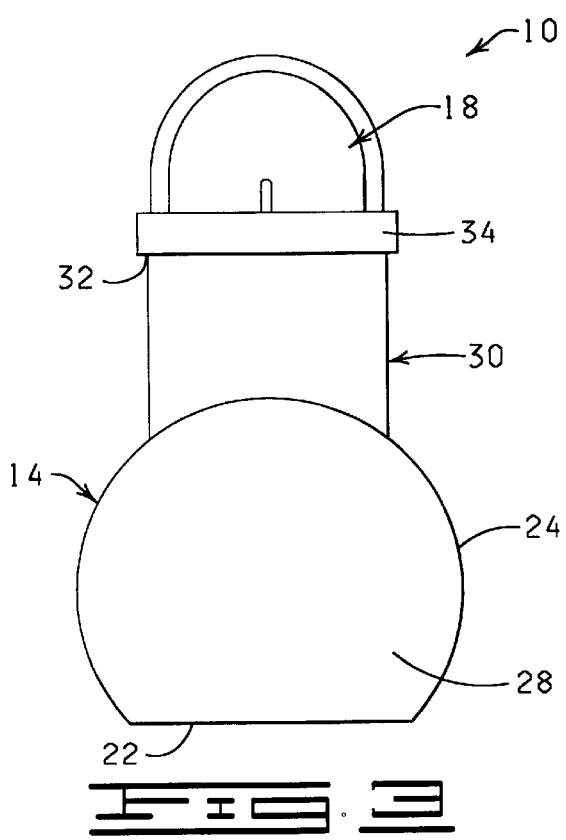
FIG. 3 is a rear elevational view of the animal shelter of FIG. 2.

Referring now to FIGS. 1–3, the housing 14 is shown herein to have a substantially arcuate shape. More specifically, the housing 14 has a flat bottom 22, an arcuate sidewall 24 extending from the flat bottom 22 (FIGS. 2 and 3), a first flat end wall 26, and a second flat end wall 28. The first and second flat end walls 26 and 28 extend from the flat bottom 22 and cooperate with the flat bottom 22 and the arcuate sidewall 24 to define the shelter cavity 16. It will be appreciated, however, that the housing 14 may be constructed in a variety of different shapes so long as the shelter cavity 16 can accommodate at least one animal and the housing 14 is capable of supporting the ground 12 disposed above the housing 14 when the housing 14 is positioned within the ground 12.

To permit easy access to the shelter cavity 16 by an individual, an access conduit 30 extends upwardly from the housing 14 in open communication with the shelter cavity 16 of the housing 14. The access conduit 30 extends a distance upwardly such that a distal end 32 of the access conduit 30 is disposed above the surface of the ground 12 when the housing 14 is disposed within the ground 12.

The distal end 32 of the access conduit 30 is covered with a lid 34. The lid 34 is sized and shaped to fit about the distal end 32 of the access conduit 30 to close off the access conduit 30 from the elements. When access to the shelter cavity 16 is desired, the lid 34 is removed. With the lid 34 removed, an individual can access the shelter cavity 16 to carry out a variety of tasks, including cleaning the shelter cavity 16 of the housing 14, training an animal to enter the animal shelter 10, or removing an animal reluctant to come out of the animal shelter 10.

Referring now to FIGS. 1 and 2, an animal gains access to the shelter cavity 16 of the housing 14 through the hatchway 18. The hatchway 18 defines a travel path 36 (FIG. 1) which is in open communication with the shelter cavity 16 to permit ingress to and egress from the shelter cavity 16. The hatchway 18 extends upwardly and outwardly from the first flat end wall 26 of the housing 12 such that a distal end 38 of the hatchway 18 is disposed above the surface of the ground 12 when the housing 14 of the animal shelter 10 is disposed within the ground 12.

The hatchway 18 has a length that is sufficient to provide access to the shelter cavity 16 of the housing 14 from the surface of the ground 12 when the housing 14 is buried in the ground 12 a depth sufficient to maintain a substantially constant temperature within the shelter cavity 16 of the housing 14. It has been found that burying the housing 14 in the ground 12 so that at least about twelve inches of soil is disposed above the housing 12 is generally sufficient to maintain the temperature of the shelter cavity 16 in a range from about 68° F. to about 70° F. when the exterior temperature ranges from −30° F. to 100° F.

To facilitate any ingress to and egress from the shelter cavity 16 through the hatchway 18, the hatchway 18 is formed to have a plurality of steps 40 along the length thereof. However, other structures and devices can be used to facilitate ingress and egress through the hatchway 18. For example, a rubber mat could be secured along the length of the hatchway 18.

As mentioned above, the foyer 20 extends from the distal end 38 of the hatchway 18 to provide an animal access to the hatchway 18 while preventing elements, such as rain and snow, from entering the hatchway 18 and passing into the shelter cavity 16 of the housing 14. The foyer 20 provides an enclosed passageway 42 which is in open communication with the travel path 36 of the hatchway 18. The foyer 20 has an open end 44 and a floor 46.

As best shown in FIG. 1, the floor 46 of the foyer 20 is angularly disposed in a downward direction relative to the distal end 38 of the hatchway 18. This downward angulation of the floor 46 prevents liquids from flowing freely into the hatchway 18 and down into the shelter cavity 16 of the housing 14. In other words, the floor 46 of the foyer 20 is angled to function as a dam which prevents liquids from flowing into the hatchway 18 when the animal shelter 10 is disposed in the ground 12.

The animal shelter 10 is preferably constructed of a polymeric material so that the housing 14, the enclosed hatchway 18, the foyer 20, and the access conduit 30 are formed as a single piece. Forming the animal shelter 10 of a polymeric material provides a lightweight, waterproof shelter which is easy to transport and install. However, it should be understood that the animal shelter 10 can be constructed from a variety of materials and can be formed of multiple components.

With reference to FIG. 1, the animal shelter 10 is installed in the ground 12 by first forming a hole 48 in the ground 12. The hole 48 is sized to receive the animal shelter 10 whereby the housing 14 can be positioned a depth below the surface of the ground 12 sufficient to maintain a substantially constant temperature within the shelter cavity 16 with the foyer 20 positioned above the surface of the ground 12 to permit access to the animal shelter 10. With the hole 48 formed, the animal shelter 10 is lowered into the hole 48 with the distal end 38 of the hatchway 18 and the foyer 20 positioned above the surface of the ground 12 and the floor 46 of the foyer 20 angled downwardly from the distal end 38 of the hatchway 18 so as to prevent liquids from freely flowing into the hatchway 18 and down into the shelter cavity 16. Finally, the hole 48 is filled in so that the housing 14 is disposed beneath the surface of the ground 12 a sufficient depth to maintain the temperature of the shelter cavity 16 substantially constant and so that the distal end 32 of the access conduit 30 extends above the surface of the ground 12.

Turning now to FIG. 4, shown therein and designated by the general reference number 100 is a second embodiment of an animal shelter constructed in accordance with the present invention. The animal shelter 100 has a housing 102 defining a shelter cavity 104, a first enclosed hatchway 106, a second enclosed hatchway 108, a first foyer 110 extending from the first hatchway 106 and a second foyer 112 extending from the second hatchway 108. The animal shelter 100 is similar in construction and function to the animal shelter 10 hereinbefore described in detail with reference to FIGS. 1–3, except as hereinafter described.

The housing 102 is similar in construction to the housing 14 of the animal shelter 10 of FIGS. 1–3. Thus, the housing 102 has a flat bottom 114, an arcuate sidewall 116 extending from the flat bottom 114, a first flat end wall 117, and a second flat end wall 118. The housing 102 is sized such that the shelter cavity 104 accommodates at least one animal.

To facilitate the ingress to and egress from the shelter cavity 104 of the housing 102 of the animal shelter 100, two hatchways 106 and 108 are provided. The first enclosed hatchway 106 extends from the first flat end wall 117 and the second enclosed hatchway 108 extends from the second flat end wall 118. The first and second hatchway 106 and 108 are similar in construction to the hatchway 18 of animal shelter 10 described above in reference to FIGS. 1–3. Therefore, no further description of the first and second hatchway 106 and 108 is believed to be necessary to enable one of ordinary skill in the art to construct the first and second hatchway 106 and 108 of the animal shelter 100.

The first foyer 110 has an open end 124 and is attached to a distal end 120 of the first hatchway 106; and the second foyer 112 has an open end 126 and is attached to a distal end 122 of the second hatchway 108. The foyers 110 and 112 differ from the foyer 20 of FIGS. 1–3 in that the foyers 110 and 112 are attached to the distal ends 120 and 122 of the hatchways 106 and 108 such that the open ends 124 and 126 are substantially parallel to the ground 12. As shown in FIG. 4, the animal shelter 100 is disposed in the ground a depth such that the open ends 124 and 126 of the foyers 110 and 112 are suspended above the ground 12 a sufficient distance to allow an animal to pass under one of the open ends 124 and 126 to gain ingress to and egress from the shelter cavity 104 of the housing 102 through the hatchways 106 and 108. Such an arrangement prevents elements, such as rain and snow, from entering the first and second hatchway 106 and 108 and passing down into the shelter cavity 104 of the housing 102.

While the animal shelter 100 has been described as having foyers 110 and 112 which are suspended above the ground, it will be understood that the animal shelter 100, as shown in FIG. 4, can be formed to have foyers similar in construction to the foyer 20 of the animal shelter 10 as shown in FIGS. 1–3. Conversely, it will be understood that the animal shelter 10 may be formed to have a foyer similar in construction to the foyer 110 or 112.

Changes may be made in the embodiments of the invention described herein, or in the parts or the elements of the embodiments described herein or in the steps or sequence of steps of the methods described herein without departing from the spirit and/or the scope of the invention as defined in the following claims.

What is claimed:

1. An animal shelter, comprising:
   a housing defining a shelter cavity sized to accommodate one or more animals;
   an enclosed hatchway defining a travel path therethrough which is in open communication with the shelter cavity of the housing to permit ingress to and egress from the shelter cavity of the housing, the hatchway extending upwardly and outwardly from the housing a sufficient distance such that when the housing is disposed in the ground a depth sufficient to maintain the temperature within the shelter cavity substantially constant, a distal end of the hatchway is disposed above the ground; and
   a foyer extending outwardly and angularly from the distal end of the hatchway and in open communication therewith, the foyer having an open end positioned to permit the animal to travel unassisted back and forth between the surface of the around and the hatchway.

2. The animal shelter of claim 1 wherein the foyer is suspended above the ground.

3. The animal shelter of claim 1 further comprising:
   an access conduit extending from the housing and in open communication with the shelter cavity of the housing, the access conduit extending a distance upward such that a distal end of the access conduit is disposed above the surface of the ground when the housing is disposed in the ground; and
   a lid selectively positionable over the distal end of the access conduit to close off the access conduit from the elements.

4. The animal shelter of claim 1 wherein the hatchway is provided with a plurality of steps.

5. The animal shelter of claim 4 wherein the housing, the enclosed hatchway, and the foyer are formed of a polymeric material.

6. The animal shelter of claim 1 wherein the housing, the enclosed hatchway, and the foyer are formed as a single piece.

7. The animal shelter of claim 1 wherein the housing has a substantially flat bottom, an arcuate sidewall extending from the flat bottom, and a pair of flat endwalls extending from the flat floor and cooperating with the flat bottom and the arcuate sidewall to define the shelter cavity.

8. An animal shelter, comprising:
   a housing defining a shelter cavity sized to accommodate one or more animal;
   an enclosed hatchway defining a travel path therethrough which is in open communication with the shelter cavity of the housing to permit ingress and egress from the shelter cavity of the housing, the hatchway extending upwardly and outwardly from the housing a sufficient distance such that when the housing is disposed in the ground a depth sufficient to maintain the temperature within the housing substantially constant at all times, a distal end of the hatchway is disposed above the ground; and
   a foyer extending from the distal end of the hatchway and in open communication therewith, the foyer having an open end positioned to permit the animal to travel unassisted back and forth between the surface of the ground and the hatchway, the foyer having a floor that is angularly disposed in a downward direction from the distal end of the hatchway to prevent liquids from freely flowing into the hatchway and into the shelter cavity of the housing.

9. The animal shelter of claim 8 further comprising:
   an access conduit extending from an upper end of the housing in open communication with the shelter cavity of the housing, the access conduit extending a distance upward such that a distal end of the access conduit is disposed above the surface of the ground when the housing is disposed in the ground; and
   a lid selectively positionable over the distal end of the access conduit to close off the access conduit from the elements.

10. The animal shelter of claim 8 wherein the hatchway is provided with a plurality of steps.

11. The animal shelter of claim 8 wherein the housing, the enclosed hatchway, and the foyer are formed as a single piece.

12. The animal shelter of claim 11 wherein the housing, the enclosed hatchway, and the foyer are formed of a polymeric material.

13. The animal shelter of claim 8 wherein the housing has a substantially flat bottom, an arcuate sidewall extending from the flat bottom, and a pair of flat end walls extending from the flat floor and cooperating with the flat bottom and the arcuate sidewall to define the shelter cavity.

14. An animal shelter, comprising:
   a housing defining a shelter cavity sized to accommodate one or more animals, the housing having a first opening in one end thereof for permitting access to the shelter cavity and having a second opening in another end thereof for permitting access to the shelter cavity;
   a first enclosed hatchway defining a travel path therethrough which is in open communication with the shelter cavity of the housing to permit ingress and egress from the shelter cavity of the housing, the hatchway extending upwardly and outwardly from the housing a sufficient distance such that when the housing is disposed in the ground a depth sufficient to maintain the temperature within the housing substantially constant at all times, a distal end of the hatchway is disposed above the ground;
   a second enclosed hatchway defining a travel path therethrough which is in open communication with the shelter cavity of the housing to permit ingress to and egress from the shelter cavity of the housing, the hatchway extending upwardly and outwardly from the housing a sufficient distance such that when the housing is disposed in the ground a depth sufficient to maintain the temperature within the housing substantially constant at all times, a distal end of the hatchway is disposed above the ground;
   a first foyer extending from the distal end of the first enclosed hatchway and in open communication therewith, the first foyer having a floor that is angularly disposed in a downward direction from the distal end of the first hatchway to prevent liquids from freely flowing into the first hatchway and into the shelter cavity of the housing; and
   a second foyer extending from the distal end of the second enclosed hatchway and in open communication therewith, the first foyer having a floor that is angularly disposed in a downward direction from the distal end of the second hatchway to prevent liquids from freely flowing into the second hatchway and into the shelter cavity of the housing.

15. The animal shelter of claim 14 wherein the first foyer is suspended above the ground.

16. The animal shelter of claim 14 wherein the second foyer is suspended above the ground.

17. The animal shelter of claim 14 wherein the first foyer is suspended above the ground and wherein the second foyer is suspended above the ground.

18. The animal shelter of claim 17 wherein the housing, the first enclosed hatchway, the second enclosed hatchway, the first foyer and the second foyer are formed as a single piece.

19. The animal shelter of claim 14 further comprising:
   an access conduit extending from an upper end of the housing in open communication with the shelter cavity of the housing, the access conduit extending a distance upward such that a distal end of the access conduit is disposed above the surface of the ground when the housing is disposed in the ground; and
   a lid selectively positionable over the distal end of the access conduit to close off the access conduit from the elements.

20. The animal shelter of claim 14 wherein the first enclosed hatchway is provided with a plurality of steps and wherein the second enclosed hatchway is provided with a plurality of steps.

21. The animal shelter of claim 14 wherein the housing, the first enclosed hatchway, the second enclosed hatchway, the first foyer and the second foyer are formed of a polymeric material.

22. The animal shelter of claim 14 wherein the housing has a substantially flat bottom, an arcuate sidewall extending from the flat bottom, and a pair of flat end walls extending from the flat floor and cooperating with the flat bottom and the arcuate sidewall to define the shelter cavity.

23. A method of providing an animal shelter comprising a housing defining a shelter cavity sized to accommodate one or more animals, an enclosed hatchway defining a travel path therethrough which is in open communication with the shelter cavity of the housing to permit ingress and egress from the shelter cavity of the housing, the hatchway extending upwardly and outwardly from the housing a sufficient distance such that when the housing is disposed in the ground a depth sufficient to maintain the temperature within the housing substantially constant at all times, a distal end of the hatchway is disposed above the ground, and a foyer extending from the distal end of the hatchway and in open communication therewith in the ground, comprising the steps of:

forming a hole in the ground;

inserting the housing into the hole with the distal end of the enclosed hatchway and the foyer disposed above the ground; and covering the housing such that the hole is filled and the housing is maintained at the predetermined depth below the ground.

24. The method of claim 23 wherein in the step of inserting the housing, the foyer is positioned such that a floor of the foyer is angularly disposed in a downward direction to prevent liquids from freely flowing into the hatchway and into the shelter cavity of the housing.

25. The method of claim 23 wherein in the step of inserting the housing, the foyer is positioned such that the foyer is suspended above the ground.

26. A method of providing an animal shelter comprising a housing defining a shelter cavity sized to accommodate one or more animals, a first enclosed hatchway defining a travel path therethrough which is in open communication with the shelter cavity of the housing to permit ingress and egress from the shelter cavity of the housing, a second enclosed hatchway defining a travel path therethrough which is in open communication with the shelter cavity of the housing to permit ingress and egress from the shelter cavity of the housing, the first and second enclosed hatchways extending upwardly and outwardly from the housing a sufficient distance such that when the housing is disposed in the ground a depth sufficient to maintain the temperature within the housing substantially constant at all times, a distal end of the first hatchway is disposed above the ground, a distal end of the second hatchway is disposed above the ground, a first foyer extending from the distal end of the first hatchway and in open communication therewith in the ground, and a second foyer extending from the distal end of the second hatchway and in open communication therewith in the ground, comprising the steps of:

forming a hole in the ground;

inserting the housing into the hole with the distal end of the enclosed hatchway disposed above the ground; and covering the housing such that the hole is filled and the housing is maintained at the predetermined depth below the ground.

27. The method of claim 26 wherein in the step of inserting the housing, the first foyer is positioned such that a floor of the first foyer is angularly disposed in a downward direction to prevent liquids from freely flowing into the hatchway and into the shelter cavity of the housing.

28. The method of claim 26 wherein in the step of inserting the housing, the second foyer is positioned such that a floor of the second foyer is angularly disposed in a downward direction to prevent liquids from freely flowing into the hatchway and into the shelter cavity of the housing.

29. The method of claim 26 wherein in the step of inserting the housing, the first foyer is positioned such that a floor of the first foyer is angularly disposed in a downward direction and a floor of the second foyer is angularly disposed in a downward direction to prevent liquids from freely flowing into the hatchway and into the shelter cavity of the housing.

30. The method of claim 26 wherein the step of inserting the housing, the first foyer is positioned such that the first foyer is suspended above the ground to prevent liquids from freely flowing into the hatchway and into the shelter cavity of the housing.

31. The method of claim 26 wherein the step of inserting the housing, the second foyer is positioned such that the second foyer is suspended above the ground to prevent liquids from freely flowing into the hatchway and into the shelter cavity of the housing.

32. The method of claim 26 wherein the step of inserting the housing, the first foyer is positioned such that the first foyer is suspended above the ground and the second foyer is positioned such that the second foyer is suspended above the ground to prevent liquids from freely flowing into the hatchway and into the shelter cavity of the housing.

\* \* \* \* \*